(12) United States Patent
Oh

(10) Patent No.: US 11,590,884 B2
(45) Date of Patent: Feb. 28, 2023

(54) DRIVING CONTROL METHOD AND SYSTEM FOR VEHICLES

(71) Applicant: HYUNDAI MOBIS CO., LTD., Seoul (KR)

(72) Inventor: Jun Hyeong Oh, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/402,959

(22) Filed: Aug. 16, 2021

(65) Prior Publication Data

US 2022/0063482 A1  Mar. 3, 2022

(30) Foreign Application Priority Data

Aug. 31, 2020 (KR) ........................ 10-2020-0110069

(51) Int. Cl.
| | | |
|---|---|---|
| B60Q 1/22 | (2006.01) | |
| B60Q 1/26 | (2006.01) | |
| B60Q 1/32 | (2006.01) | |
| B60Q 1/50 | (2006.01) | |
| B62D 15/02 | (2006.01) | |

(52) U.S. Cl.
CPC .................. B60Q 1/32 (2013.01); B60Q 1/50 (2013.01); B62D 15/029 (2013.01); *B60Q 2400/50* (2013.01)

(58) Field of Classification Search
CPC ........ B60Q 1/32; B60Q 1/50; B60Q 2400/50; B62D 15/029
See application file for complete search history.

(56) References Cited

U.S. PATENT DOCUMENTS

| | | | |
|---|---|---|---|
| 4,947,293 A | 8/1990 | Johnson et al. | |
| 6,497,297 B1* | 12/2002 | Ebert | G01D 7/08 |
| | | | 701/119 |
| 10,595,176 B1* | 3/2020 | Gallagher | G08G 1/163 |
| 10,955,855 B1* | 3/2021 | Tran | G05D 1/0246 |
| 2003/0147247 A1* | 8/2003 | Koike | B60Q 9/004 |
| | | | 362/464 |
| 2005/0237758 A1* | 10/2005 | Takeda | B60Q 1/14 |
| | | | 362/512 |
| 2009/0012709 A1* | 1/2009 | Miyazaki | G01C 21/3822 |
| | | | 701/514 |
| 2010/0241343 A1* | 9/2010 | Byun | G06V 20/588 |
| | | | 382/103 |
| 2015/0227800 A1* | 8/2015 | Takemae | E01F 11/00 |
| | | | 382/104 |
| 2017/0205235 A1* | 7/2017 | Vladimerou | G01C 21/16 |
| 2018/0037216 A1* | 2/2018 | Otake | B60W 30/12 |
| 2018/0273031 A1* | 9/2018 | Fujita | G05D 1/021 |

(Continued)

FOREIGN PATENT DOCUMENTS

KR  10-2018-0119921 A  11/2018

*Primary Examiner* — Quang Pham
(74) *Attorney, Agent, or Firm* — NSIP Law

(57) ABSTRACT

A driving control method for vehicles includes: determining, by a controller, whether virtual guide lines need to be generated, based on a state of turn guide lines disposed at sides of a host vehicle when the host vehicle enters an intersection and drives while turning; and controlling, by the controller, the host vehicle to radiate optical guide lines on a road surface requiring generation of the virtual guide lines, using light, in response to determining that the virtual guide lines need to be generated.

16 Claims, 5 Drawing Sheets

(56) References Cited

U.S. PATENT DOCUMENTS

| | | | |
|---|---|---|---|
| 2018/0370567 A1* | 12/2018 | Rowell | B62D 15/0295 |
| 2019/0027040 A1* | 1/2019 | Ogawa | B60R 21/00 |
| 2019/0041038 A1* | 2/2019 | White | B60Q 1/143 |
| 2019/0113925 A1* | 4/2019 | Sim | G01C 21/3889 |
| 2019/0168666 A1* | 6/2019 | Nomura | B60K 37/00 |
| 2019/0293936 A1* | 9/2019 | Okayama | H04N 13/30 |
| 2019/0329708 A1* | 10/2019 | Hakki | B60Q 9/008 |
| 2020/0047807 A1* | 2/2020 | Kim | B62D 15/028 |
| 2020/0079394 A1* | 3/2020 | Masuda | B60W 60/00186 |
| 2020/0114933 A1* | 4/2020 | Ono | B60W 30/18009 |
| 2020/0408536 A1* | 12/2020 | Fasola | G01C 21/3837 |
| 2021/0097308 A1* | 4/2021 | Kumar | G06V 10/44 |
| 2021/0402986 A1* | 12/2021 | Imai | G08G 1/168 |
| 2022/0017084 A1* | 1/2022 | Hausleitner | B60W 30/09 |
| 2022/0135061 A1* | 5/2022 | Seitz | G06T 15/00 |
| | | | 701/26 |
| 2022/0169257 A1* | 6/2022 | Kikuta | B60W 40/08 |
| 2022/0212670 A1* | 7/2022 | Aoki | B60W 30/18163 |

* cited by examiner

DRIVING CONTROL METHOD AND SYSTEM FOR VEHICLES

CROSS-REFERENCE TO RELATED APPLICATIONS

This application claims the benefit under 35 U.S.C. § 119(a) of Korean Patent Application No. 10-2020-0110069 filed on Aug. 31, 2020 in the Korean Intellectual Property Office, the entire disclosure of which is incorporated herein by reference for all purposes.

BACKGROUND OF THE INVENTION

1. Field of the Invention

The present invention relates to a driving control method and system for vehicles in which, when a host vehicle turns at an intersection, the host vehicle radiates turn guide lines using lasers so as to prevent collision between turning vehicles.

2. Description of the Related Art

Turn guide lines are drawn on a road along a path along which left-turning vehicles are turned at an intersection in which left-turn is possible.

Therefore, when a vehicle turns left at the intersection, a driver of the left-turning vehicle drives the vehicle along the turn guide lines.

However, if the turn guide lines are drawn at the side of a first lane, i.e., the innermost lane, it is difficult for the driver of a vehicle turning left in a second lane or a higher lane to accurately recognize a turning path.

Further, even when the turn guide lines are drawn at the sides of all lanes, the turn guide lines may be blurred so that it is difficult to visually discern the turn guide lines, and thus, drivers may not accurately recognize the turning path.

Therefore, this case may aggravate physiological anxiety and burden which a driver feels in the turning situation, and may allow a host vehicle to enter another lane during turning, thereby being capable of increasing a risk of collision between vehicles.

The above information disclosed in the Background section is only for enhancement of understanding of the background of the invention and should not be interpreted as conventional technology that is already known to those skilled in the art.

SUMMARY OF THE INVENTION

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

In one general aspect, a driving control method for vehicles includes: determining, by a controller, whether virtual guide lines need to be generated, based on a state of turn guide lines disposed at sides of a host vehicle when the host vehicle enters an intersection and drives while turning; and controlling, by the controller, the host vehicle to radiate optical guide lines on a road surface requiring generation of the virtual guide lines, using light, in response to determining that the virtual guide lines need to be generated.

The controlling of the host vehicle to radiate the optical guide lines on the road surface may include controlling the host vehicle to radiate the optical guide lines on the road surface at a remaining side of a driving lane of the host vehicle based on the turn guide lines, in response to the turn guide lines being displayed on the road surface at one side of the driving lane of the host vehicle.

The controlling of the host vehicle to radiate the optical guide lines on the road surface may include controlling the host vehicle to radiate the optical guide lines on the road surface at one side of the host vehicle, among the sides of the host vehicle, based on the turn guide lines, in response to the turn guide lines being displayed in a lane other than a driving lane of the host vehicle.

The controlling of the host vehicle to radiate the optical guide lines on the road surface may further include controlling the host vehicle to radiate the optical guide lines on the road surface at a remaining side of the host vehicle, among the sides of the host vehicle, based on the turn guide lines.

The determining of whether the virtual guide lines need to be generated may include detecting other vehicle optical guide lines radiated by one or more other vehicles so as to be displayed at the sides of the host vehicle. The controlling of the host vehicle to radiate the optical guide lines on the road surface may include controlling the host vehicle to radiate the optical guide lines on the road surface at one side of the host vehicle, among the sides of the host vehicle, based on the other vehicle optical guide lines, in response to the other vehicle optical guide lines being displayed in a lane other than a driving lane of the host vehicle.

The controlling of the host vehicle to radiate the optical guide lines on the road surface may include controlling the host vehicle to radiate the optical guide lines on the road surface at a remaining side of the host vehicle, among the sides of the host vehicle, based on the other vehicle optical guide lines.

The determining of whether the virtual guide lines need to be generated may include detecting other vehicle optical guide lines radiated by one or more other vehicles. The controlling of the host vehicle to radiate the optical guide lines on the road surface may include controlling the host vehicle to radiate the optical guide lines on the road surface at a remaining side of the host vehicle, among the sides of the host vehicle, based on the other vehicle optical guide lines, in response to the other vehicle optical guidelines being displayed on the road surface at one side of the host vehicle, among the sides of the host vehicle.

The driving control method may further include not radiating the optical guide lines, in response to the turn guide lines being respectively displayed on the road surface at two sides of a driving lane of the host vehicle.

The controlling of the host vehicle to radiate the optical guide lines on the road surface may include controlling the host vehicle to radiate the optical guide lines on first turn guide lines displayed on the road surface at a first side of a driving lane of the host vehicle, among the turn guide lines, based on second turn guide lines displayed on the road surface at a second side of the driving lane, among the turn guide lines, in response to the first turn guide lines having a relatively lower recognition rate equal to or below a reference value, and the second turn guide lines having a relatively higher recognition rate.

In another general aspect, a driving control system for vehicles includes: a determiner configured to determine whether virtual guide lines need to be generated, based on a state of turn guide lines disposed at sides of a host vehicle when the host vehicle enters an intersection and drives while turning; and a radiator configured to control the host vehicle to radiate optical guide lines on a road surface requiring generation of the virtual guide lines, using light, in response to the determiner determining that the virtual guide lines need to be generated.

The radiator may be further configured to control the host vehicle to radiate the optical guide lines on the road surface at a remaining side of a driving lane of the host vehicle based on the turn guide lines, in response to the turn guide lines being displayed on the road surface at one side of the driving lane of the host vehicle.

The radiator may be further configured to control the host vehicle to radiate the optical guide lines on the road surface at one side of the host vehicle, among the sides of the host vehicle, based on the turn guide lines, in response to the turn guide lines being displayed in a lane other than a driving lane of the host vehicle.

The radiator may be further configured to control the host vehicle to radiate the optical guide lines on the road surface at a remaining side of the host vehicle, among the sides of the host vehicle, based on the turn guide lines.

The determiner may be further configured to detect other vehicle optical guide lines radiated by one or more other vehicles so as to be displayed at the sides of the host vehicle. The radiator may be further configured to control the host vehicle to radiate the optical guide lines on the road surface at one side of the host vehicle, among the sides of the host vehicle, based on the other vehicle optical guide lines, in response to the other vehicle optical guide lines being displayed in a lane other than the driving lane of the host vehicle.

The radiator may be further configured to control the host vehicle to radiate the optical guide lines on the road surface at a remaining side of the host vehicle, among the sides of the host vehicle, based on the other vehicle optical guide lines.

The determiner may be further configured to detect other vehicle optical guide lines radiated by one or more other vehicles. The radiator may be further configured to control the host vehicle to radiate the optical guide lines on the road surface at a remaining side of the host vehicle, among the sides of the host vehicle, based on the other vehicle optical guide lines, in response to the other vehicle optical guide lines being displayed on the road surface at one side of the host vehicle, among the sides of the host vehicle.

The host vehicle may be configured to not radiate the optical guide lines, in response to the turn guide lines being respectively displayed on the road surface at two sides of a driving lane of the host vehicle.

The radiator may be further configured to control the host vehicle to radiate the optical guide lines on first turn guide lines displayed on the road surface at a first side of a driving lane of the host vehicle, among the turn guide lines, based on second turn guide lines displayed on the road surface at a second side of the driving lane, among the turn guide lines, in response to the first turn guide lines having a relatively lower recognition rate equal to or below a reference value, and the second turn guide lines having a relatively higher recognition rate.

Other features and aspects will be apparent from the following detailed description, the drawings, and the claims.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION

Reference will now be made in detail to the preferred embodiments of the present invention, examples of which are illustrated in the accompanying drawings. Wherever possible, the same reference numbers will be used throughout the drawings to refer to the same or like parts.

Figure 1:
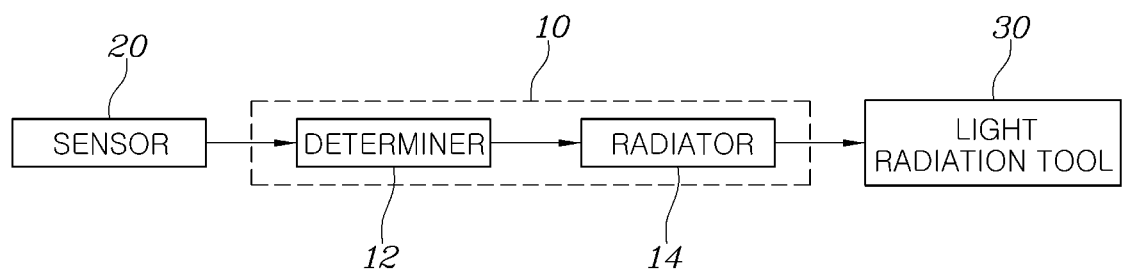
FIG. 1 is a block diagram schematically illustrating a driving control system for vehicles according to the present invention.

FIG. 1 is a block diagram schematically illustrating a driving control system for vehicles according to the present invention.

Referring to this figure, the driving control system for vehicles according to the present invention includes a determiner 12 configured to determine whether or not virtual guide lines need to be generated depending on the state of turn guide lines L1 disposed at both sides of a host vehicle when the host vehicle enters an intersection and drives while turning, and a radiator 14 configured to control the host vehicle to radiate optical guide lines L2 on a road surface requiring generation of the virtual guide lines using light upon determining that the virtual guide lines need to be generated.

For example, the present invention is applicable to a vehicle provided with an advanced driver assistance system (ADAS) mounted therein, and a plurality of ADAS sensors 20 is installed in the host vehicle so as to achieve the functions of the ADAS. The ADAS sensors 20 may be various sensors 20, such as radars, cameras, lidars, etc.

Therefore, data acquired by the ADAS sensors 20 may be provided to the determiner 12, and the determiner 12 may determine a lane in which the host vehicle drives and determine whether or not the host vehicle enters the intersection based on the data acquired by the ADAS sensors 20, and particularly, may confirm the turning guide lines L1 drawn at the intersection.

Further, in addition to the data acquired by the ADAS sensors 20, turn signals may be input to the determiner 2, and thus, the determiner 12 may determine whether or not the host vehicle drives while turning right or left. In the present invention, the determiner 12 may determine whether or not the host vehicle enters a left-turn lane and whether or not the host vehicle is turning left along the intersection.

For reference, the determiner 12 may receive position information of the host vehicle provided by a GPS or a navigation system mounted on the host vehicle, and may thus more accurately determine whether or not the host vehicle enters the intersection.

Further, light radiation tools 30 may be installed on both surfaces of the host vehicle, and may radiate the optical guide lines L2 onto the road surface. The light radiation tools 30 may be laser beam radiation apparatuses which may radiate lasers, and may radiate the optical guide lines L2 using lasers.

That is, the radiator 14 may apply an operating signal to the light radiation tools 30, thereby causing the light radiation tools 30 to radiate the optical guide lines L2.

As such, in the present invention, when the host vehicle enters the intersection and drives while turning left at the intersection, based on the turn guide lines L1 drawn on the road surface at one side of the host vehicle, the host vehicle radiates the virtual optical guide lines L2 onto the road surface at a remaining side of the host vehicle.

Therefore, guide lines are respectively formed at both sides of the host vehicle along the turning path of the host vehicle and thus reduce psychological anxiety and fatigue felt by the driver of the host vehicle during turning so as to allow the driver of the host vehicle to feel a sense of stability and to stably drive the host vehicle at the intersection while turning, thereby reducing a possibility that the host vehicle invades the turning path of another lane and thus being capable of preventing a risk of collision between vehicles in a turning situation.

Further, a driving control method for vehicles according to the present invention includes determining, by a controller 10, whether or not virtual guide lines need to be generated depending on the state of turn guide lines L1 disposed at both sides of a host vehicle when the host vehicle enters an intersection and drives while turning, and controlling, by the controller 10, the host vehicle to radiate optical guide lines L2 on a road surface requiring generation of the virtual guide lines using light upon determining that the virtual guide lines need to be generated.

That is, the controller 10 may include the determiner 12 and the radiator 14, and the host vehicle may be controlled to radiate the optical guide lines L2 through the controller 10.

For reference, the controller 10 according to an exemplary embodiment of the present invention may be implemented through a non-volatile memory (not shown) configured to store an algorithm configured to control operations of various elements of the vehicle or data regarding software commands for reproducing the algorithm and a processor (not shown) configured to perform operations which will be described below using data stored in the corresponding memory. The memory and the processor may be implemented as individual chips. Alternatively, the memory and the processor may be implemented as a single integrated chip. Here, the processor may be provided in the form of one or more processors.

Figure 3:
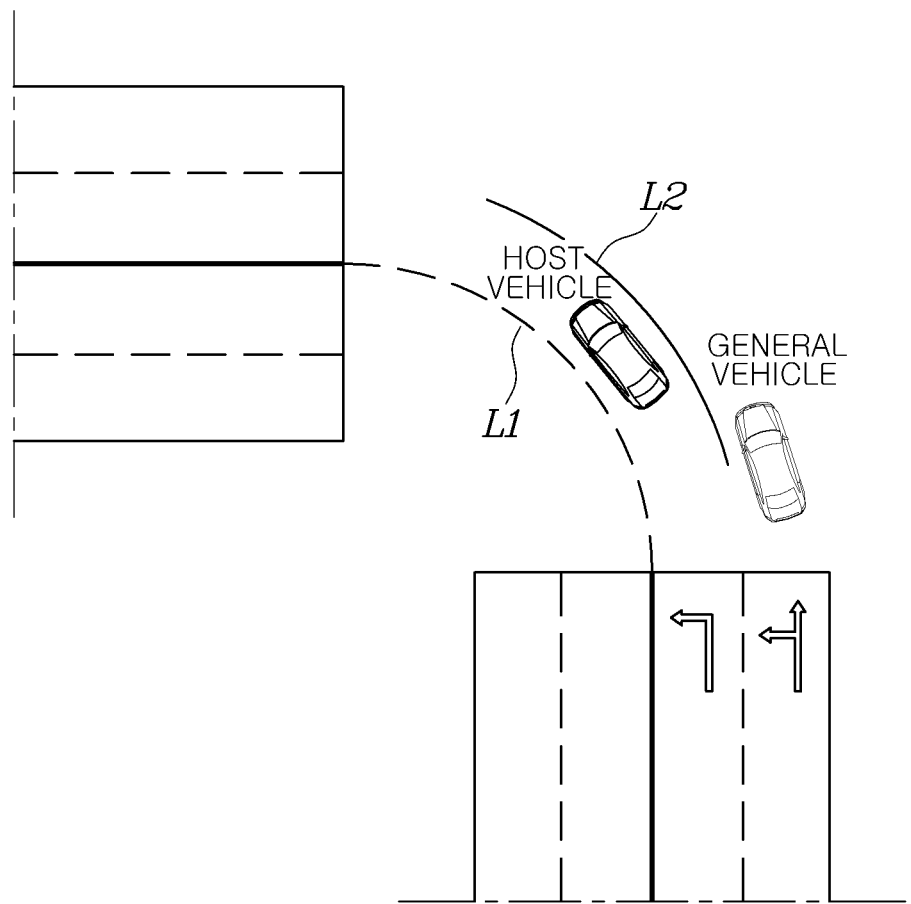
FIGS. 3 to 5 are views exemplarily illustrating turning situations in which optical guide lines are radiated according to the present invention.

FIG. 3 is a view exemplarily illustrating a turning situation in which the optical guide lines L2 are radiated when the host vehicle turns left in a first lane.

Referring to this figure, when the turn guide lines L1 are displayed on the road surface at one side of the driving lane of the host vehicle, the optical guide lines L2 may be radiated onto the road surface at the other side of the driving lane of the host vehicle based on the turn guide lines L1.

For example, when the turn guide lines L1 are drawn on the road surface at only the left side of the host vehicle in a situation in which the host vehicle turns left in the first lane, the optical guide lines L2 offset to the turn guide lines L1 are radiated onto the road surface at the right side of the host vehicle by calculating the curvature of the turn guide lines L1 and the position of the host vehicle through the ADAS sensors 20.

Therefore, the host vehicle may safely drive along the turn guide lines L1 and the optical guide lines L2, and a risk of collision between vehicles in the turning situation may be reduced.

Figure 4:
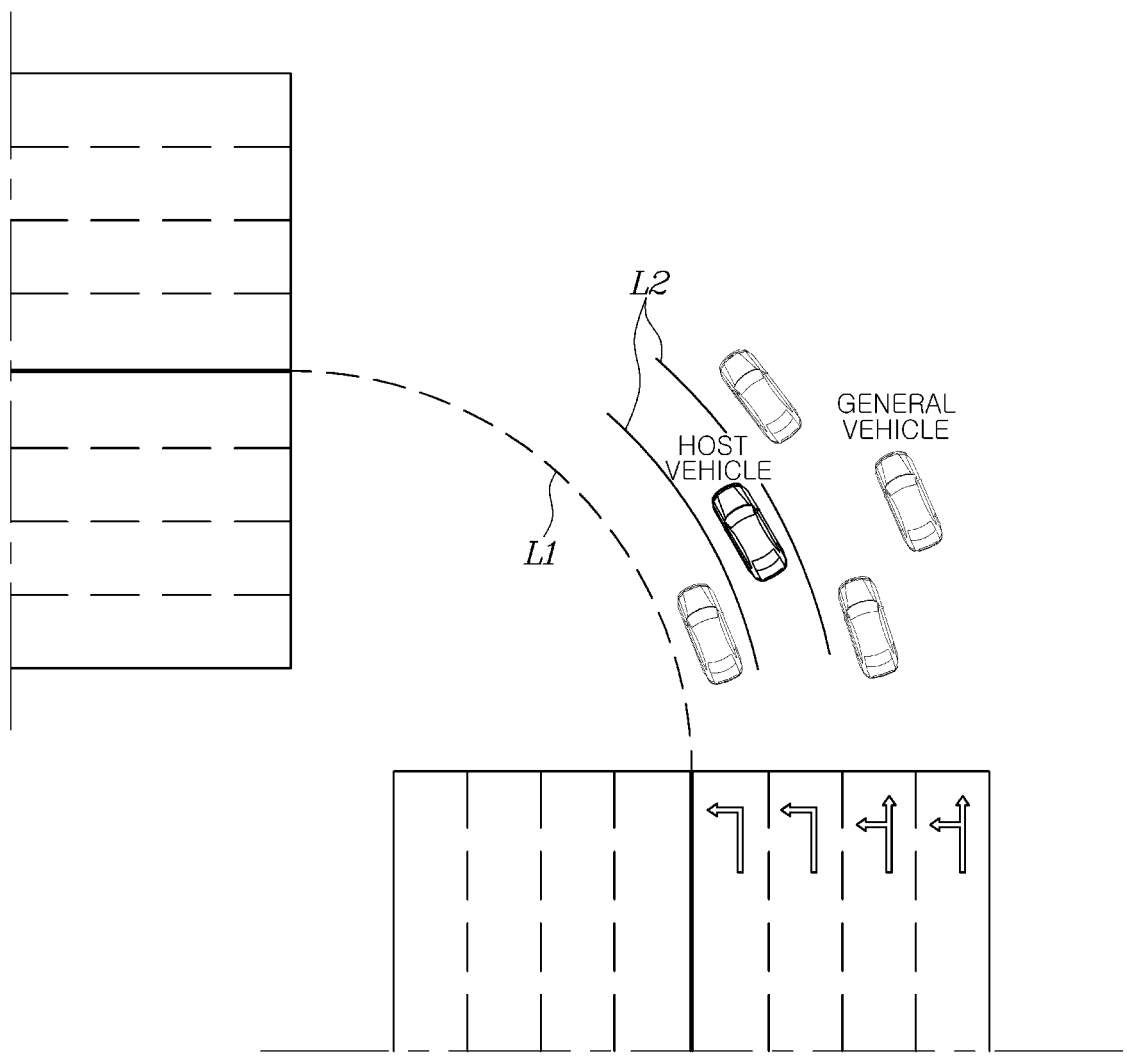

FIG. 4 is a view exemplarily illustrating a turning situation in which the optical guide lines L2 are radiated when the host vehicle turns left in a second lane.

Referring to this figure, when the turn guide lines L1 are displayed in another lane other than the driving lane of the host vehicle, the optical guide lines L2 may be radiated onto the road surface at one side of the host vehicle based on the turn guide lines L1.

Further, the optical guide lines L2 may be radiated onto the road surface at the other side of the host vehicle based on the turn guide lines L1 displayed at one side of the host vehicle.

For example, when the turn guide lines L1 are drawn on the road surface only in the innermost lane, i.e., the first lane, and the host vehicle is capable of recognize the turn guide lines L1 in a situation in which the host vehicle turns left in the second lane, the optical guide lines L2 offset to the turn guide lines L1 are radiated onto the road surface at the left and right sides of the host vehicle by calculating the curvature of the turn guide lines L1 and the position of the host vehicle through the ADAS sensors 20.

Therefore, the host vehicle may safely drive along the turn guide lines L1 and the optical guide lines L2, and a risk of collision between vehicles in the turning situation may be reduced.

Figure 5:
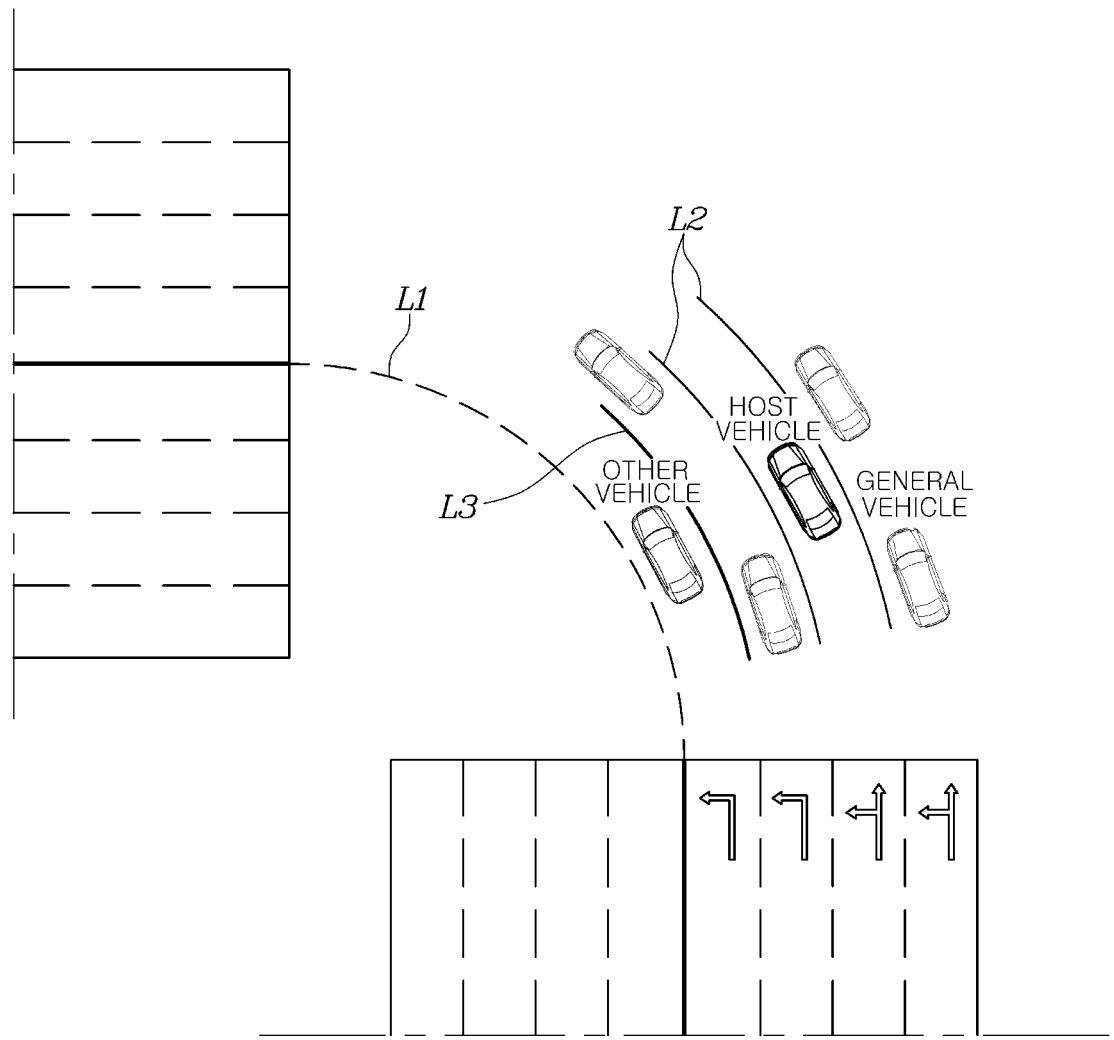

FIG. 5 is a view exemplarily illustrating a turning situation in which the optical guide lines L2 are radiated when the host vehicle turns left in a third lane.

Referring to this figure, the determiner 12 of the host vehicle determines other vehicle optical guide lines L3 which are radiated by other vehicles so as to be displayed at both sides of the host vehicle.

Here, a result of determination by the determiner 12, when the other vehicle optical guide lines L3 are displayed in another lane other than the driving lane of the host vehicle, the optical guide lines L2 may be radiated onto the road surface at one side of the host vehicle based on the other vehicle optical guide lines L3.

Further, the optical guide lines L2 may be radiated onto the road surface at the other side of the host vehicle based on the other vehicle optical guide lines L3 displayed at one side of the host vehicle.

For example, when the turn guide lines L1 are drawn on the road surface only in the innermost lane in a situation in which the host vehicle turns left in the third lane and thus the host vehicle is far away from the turn guide lines L1 and is not capable of recognizing the turn guide lines L1, it is difficult for the host vehicle to radiate the optical guide lines L2.

However, when another vehicle having the same function of radiating optical guide lines as the host vehicle drives in the first lane, the vehicle driving in the first lane radiates the other vehicle optical guide lines L3 onto the road surface at the right side thereof.

Then, the host vehicle radiates the optical guide lines L2 offset to the other vehicle optical guide lines L3 are radiated onto the road surface at the left and right sides of the host vehicle by calculating the curvature of the other vehicle optical guide lines L3 radiated by the vehicle driving in the first lane and the position of the host vehicle through the ADAS sensors 20 mounted on the host vehicle.

Therefore, the host vehicle may safely drive along the optical guide lines L2, and a risk of collision between vehicles in the turning situation may be reduced.

Further, as another situation in which the optical guide lines L2 according to the present invention are radiated, the determiner 12 of the host vehicle determines other vehicle optical guide lines L3 which are radiated by other vehicles so as to be displayed at both sides of the host vehicle.

Here, a result of determination by the determiner 12, when the other vehicle optical guide lines L3 are displayed on the road surface at one side of the host vehicle, the optical guide lines L2 may be radiated onto the road surface at the other side of the host vehicle based on the other vehicle optical guide lines L3 displayed at one side of the host vehicle.

For example, when the turn guide lines L1 are drawn on the road surface only in the innermost lane in a situation in which the host vehicle turns left in the third lane and thus the host vehicle is far away from the turn guide lines L1 and is not capable of recognizing the turn guide lines L1, it is difficult for the host vehicle to radiate the optical guide lines L2.

However, when another vehicle having the same function of radiating optical guide lines as the host vehicle drives in the second lane, the vehicle driving in the second lane radiates other vehicle optical guide lines L3 onto the road surface at the right side thereof.

Then, the host vehicle radiates the optical guide lines L2 offset to the other vehicle optical guide lines L3 are radiated onto the road surface at the right side of the host vehicle by calculating the curvature of the other vehicle optical guide lines L3 radiated by the vehicle driving in the second lane and the position of the host vehicle through the ADAS sensors 20 mounted on the host vehicle.

Therefore, the host vehicle may safely drive along the optical guide lines L2 and L3 radiated by the host vehicle and the vehicle driving in the second lane, and a risk of collision between vehicles in the turning situation may be reduced.

In addition, in the present invention, when the turn guide lines L1 are displayed at both sides of the driving lane of the host vehicle, the host vehicle is controlled so as not to radiate the optical guide lines L2.

For example, when the turn guide lines L1 are displayed at both sides of the driving lane of the host vehicle in a situation in which the host vehicle turns left, the host vehicle may drive while turning left along the turn guide lines L1, and thus, the host vehicle may not radiate the optical guide lines L2.

However, even when the turn guide lines L1 are displayed at both sides of the driving lane of the host vehicle, the turn guide lines L1 are blurred, the host vehicle may radiate the optical guide lines L2.

Concretely, when the turn guide lines L1 are respectively displayed on the road surface at both sides of the driving lane of the host vehicle and, among the turn guide lines L1 at both sides of the driving lane of the host vehicle, the recognition rate of the turn guide lines L1 at one side is equal to or less than a reference value, the optical guide lines L2 may be radiated onto the turn guide lines L1 having the relatively lower recognition rate based on the turn guide lines L1 having the relatively higher recognition rate.

For example, when the turn guide lines L1 drawn at the left side of the driving lane of the host vehicle are properly recognized but recognition of the turn guide lines L1 drawn at the left side of the driving lane of the host vehicle is lowered in a situation in which the host vehicle turns left, the optical guide lines L2 are radiated onto the road surface at the right side of the driving lane of the host vehicle based on the turn guide lines L1 drawn at the left side of the driving lane of the host vehicle.

Therefore, the host vehicle may safely drive while turning along the turn guide lines L1 and the optical guide lines L2.

Figure 2:
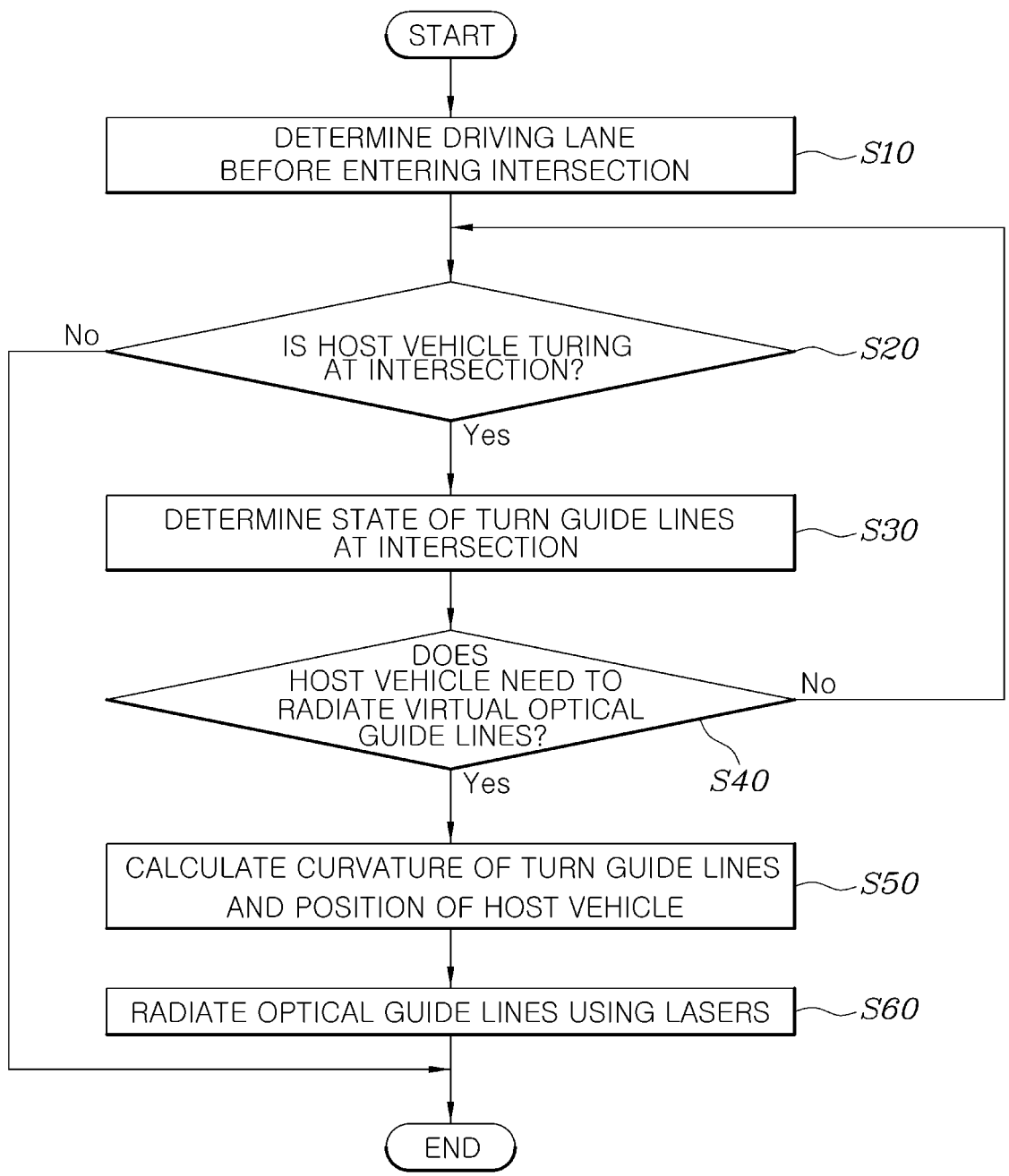
FIG. 2 is a flowchart representing a driving control method for vehicles according to the present invention.

FIG. 2 is a flowchart representing a driving control method for vehicles according to the present invention.

Hereinafter, a process for controlling driving of a host vehicle according to the present invention will be described. First, a lane in which the host vehicle drives is confirmed before the host vehicle enters an intersection (S10).

Thereafter, it is determined whether or not the host vehicle is in a situation in which the host vehicle enters the intersection and turns left (S20).

As a result of determination of Operation S20, upon determining that the host vehicle is turning left at the intersection, the state of turn guide lines L1 drawn at the intersection is determined (S30).

Thereafter, as a result of determination of Operation S30, it is determined whether or not the host vehicle needs to radiate virtual optical guide lines L2 (S40).

For example, when the turn guide lines L1 are not drawn on a turning path along which the host vehicle drives, or when the turn guide lines L1 drawn on the turning path along which the host vehicle drives are blurred and are thus not properly recognized, it is determined that the host vehicle needs to radiate the optical guide lines L2.

Upon determining that the host vehicle needs to radiate the virtual optical guide lines L2, the curvature of the turn guide lines L1 and the position of the host vehicle are calculated (S50).

The host vehicle radiates the optical guide lines L2 on the road surface at one or both sides thereof requiring radiation of the optical guide lines L2 (S60).

As described above, when the host vehicle enters the intersection and drives while turning left, based on the turn guide lines L1 drawn on the road surface at one side of the host vehicle, the virtual optical guide lines L2 are radiated onto the road surface at the other side of the host vehicle requiring turn guide lines.

Therefore, the guide lines are respectively formed at both sides of the host vehicle along the turning path of the host vehicle and thus reduce psychological anxiety and fatigue felt by the driver of the host vehicle during turning so as to allow the driver of the host vehicle to feel a sense of stability and to stably drive the host vehicle at the intersection while turning, thereby reducing a possibility that the host vehicle invades the turning path of another lane and thus being capable of preventing a risk of collision between vehicles in a turning situation.

As is apparent from the above description, in a driving control method and system for vehicles according to the present invention, when a host vehicle enters an intersection and drives while turning left, based on turn guide lines drawn on the road surface at one side of the host vehicle, virtual optical guide lines are radiated onto the road surface at the other side of the host vehicle requiring turn guide lines.

Therefore, the guide lines are respectively formed at both sides of the host vehicle along the turning path of the host vehicle and thus reduce psychological anxiety and fatigue felt by the driver of the host vehicle during turning so as to allow the driver of the host vehicle to feel a sense of stability and to stably drive the host vehicle at the intersection while turning, thereby reducing a possibility that the host vehicle invades the turning path of another lane and thus being capable of preventing a risk of collision between vehicles in a turning situation.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A driving control method for vehicles, the driving control method comprising:
   determining, by a controller, whether virtual guide lines need to be generated, based on a state of turn guide lines disposed at sides of a host vehicle when the host vehicle enters an intersection and drives while turning; and
   controlling, by the controller, the host vehicle to radiate optical guide lines on a road surface requiring generation of the virtual guide lines, using light, in response to determining that the virtual guide lines need to be generated,
   wherein the controlling of the host vehicle to radiate the optical guide lines on the road surface comprises controlling the host vehicle to radiate the optical guide lines on the road surface at one side of the host vehicle, among the sides of the host vehicle, based on the turn guide lines, in response to the turn guide lines being displayed in a lane other than a driving lane of the host vehicle.

2. The driving control method according to claim 1, wherein the controlling of the host vehicle to radiate the optical guide lines on the road surface comprises controlling the host vehicle to radiate the optical guide lines on the road surface at a remaining side of a driving lane of the host vehicle based on the turn guide lines, in response to the turn guide lines being displayed on the road surface at one side of the driving lane of the host vehicle.

3. The driving control method according to claim 1, wherein the controlling of the host vehicle to radiate the optical guide lines on the road surface further comprises controlling the host vehicle to radiate the optical guide lines on the road surface at a remaining side of the host vehicle, among the sides of the host vehicle, based on the turn guide lines.

4. The driving control method according to claim 1, wherein the determining of whether the virtual guide lines need to be generated comprises detecting other vehicle optical guide lines radiated by one or more other vehicles so as to be displayed at the sides of the host vehicle, and
   wherein the controlling of the host vehicle to radiate the optical guide lines on the road surface comprises controlling the host vehicle to radiate the optical guide lines on the road surface at one side of the host vehicle, among the sides of the host vehicle, based on the other vehicle optical guide lines, in response to the other vehicle optical guide lines being displayed in a lane other than a driving lane of the host vehicle.

5. The driving control method according to claim 4, wherein the controlling of the host vehicle to radiate the optical guide lines on the road surface comprises controlling the host vehicle to radiate the optical guide lines on the road surface at a remaining side of the host vehicle, among the sides of the host vehicle, based on the other vehicle optical guide lines.

6. The driving control method according to claim 1, wherein the determining of whether the virtual guide lines need to be generated comprises detecting other vehicle optical guide lines radiated by one or more other vehicles, and
   wherein the controlling of the host vehicle to radiate the optical guide lines on the road surface comprises controlling the host vehicle to radiate the optical guide lines on the road surface at a remaining side of the host vehicle, among the sides of the host vehicle, based on the other vehicle optical guide lines, in response to the other vehicle optical guidelines being displayed on the road surface at one side of the host vehicle, among the sides of the host vehicle.

7. The driving control method according to claim 1, further comprising not radiating the optical guide lines, in response to the turn guide lines being respectively displayed on the road surface at two sides of a driving lane of the host vehicle.

8. The driving control method according to claim 1, wherein the controlling of the host vehicle to radiate the optical guide lines on the road surface comprises controlling the host vehicle to radiate the optical guide lines on first turn guide lines displayed on the road surface at a first side of a driving lane of the host vehicle, among the turn guide lines, based on second turn guide lines displayed on the road surface at a second side of the driving lane, among the turn guide lines, in response to the first turn guide lines having a relatively lower recognition rate equal to or below a reference value, and the second turn guide lines having a relatively higher recognition rate.

9. A driving control system for vehicles, the driving control system comprising:
   a determiner configured to determine whether virtual guide lines need to be generated, based on a state of turn guide lines disposed at sides of a host vehicle when the host vehicle enters an intersection and drives while turning; and
   a radiator configured to control the host vehicle to radiate optical guide lines on a road surface requiring generation of the virtual guide lines, using light, in response to the determiner determining that the virtual guide lines need to be generated,
   wherein the radiator is further configured to control the host vehicle to radiate the optical guide lines on the road surface at one side of the host vehicle, among the sides of the host vehicle, based on the turn guide lines, in response to the turn guide lines being displayed in a lane other than a driving lane of the host vehicle.

10. The driving control system according to claim 9, wherein the radiator is further configured to control the host vehicle to radiate the optical guide lines on the road surface at a remaining side of a driving lane of the host vehicle based on the turn guide lines, in response to the turn guide lines being displayed on the road surface at one side of the driving lane of the host vehicle.

11. The driving control system according to claim 9, wherein the radiator is further configured to control the host vehicle to radiate the optical guide lines on the road surface at a remaining side of the host vehicle, among the sides of the host vehicle, based on the turn guide lines.

12. The driving control system according to claim 9, wherein the determiner is further configured to detect other vehicle optical guide lines radiated by one or more other vehicles so as to be displayed at the sides of the host vehicle, and
   wherein the radiator is further configured to control the host vehicle to radiate the optical guide lines on the road surface at one side of the host vehicle, among the sides of the host vehicle, based on the other vehicle optical guide lines, in response to the other vehicle optical guide lines being displayed in a lane other than the driving lane of the host vehicle.

13. The driving control system according to claim 12, wherein the radiator is further configured to control the host vehicle to radiate the optical guide lines on the road surface at a remaining side of the host vehicle, among the sides of the host vehicle, based on the other vehicle optical guide lines.

14. The driving control system according to claim 9, wherein the determiner is further configured to detect other vehicle optical guide lines radiated by one or more other vehicles, and wherein the radiator is further configured to control the host vehicle to radiate the optical guide lines on the road surface at a remaining side of the host vehicle, among the sides of the host vehicle, based on the other vehicle optical guide lines, in response to the other vehicle optical guide lines being displayed on the road surface at one side of the host vehicle, among the sides of the host vehicle.

15. The driving control system according to claim 9, wherein the host vehicle is configured to not radiate the optical guide lines, in response to the turn guide lines being respectively displayed on the road surface at two sides of a driving lane of the host vehicle.

16. The driving control system according to claim 9, wherein the radiator is further configured to control the host vehicle to radiate the optical guide lines on first turn guide lines displayed on the road surface at a first side of a driving lane of the host vehicle, among the turn guide lines, based on second turn guide lines displayed on the road surface at a second side of the driving lane, among the turn guide lines, in response to the first turn guide lines having a relatively lower recognition rate equal to or below a reference value, and the second turn guide lines having a relatively higher recognition rate.

* * * * *